May 30, 1961 N. W. DENSMORE 2,986,385
MINING MACHINE HAVING A PLURALITY OF DISLODGING ROTORS
Filed July 22, 1957 10 Sheets-Sheet 3
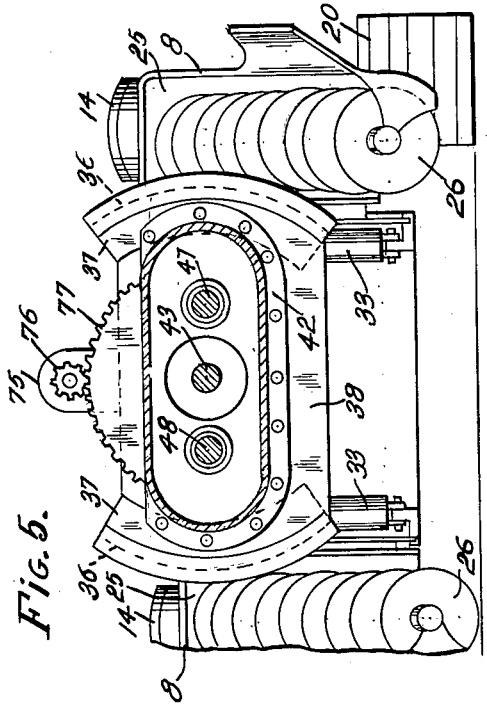
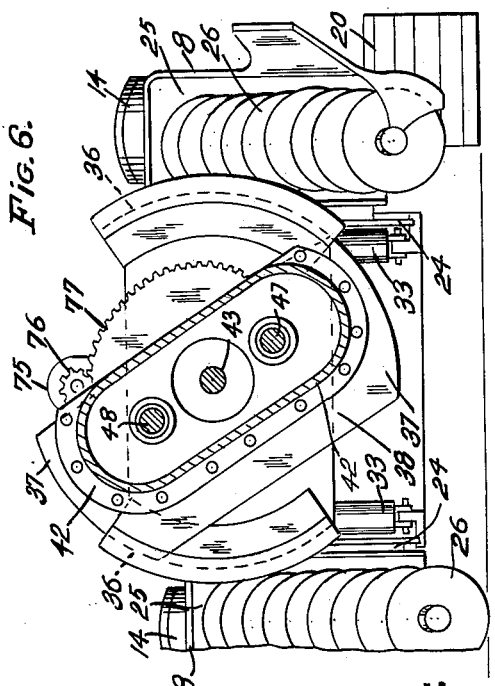
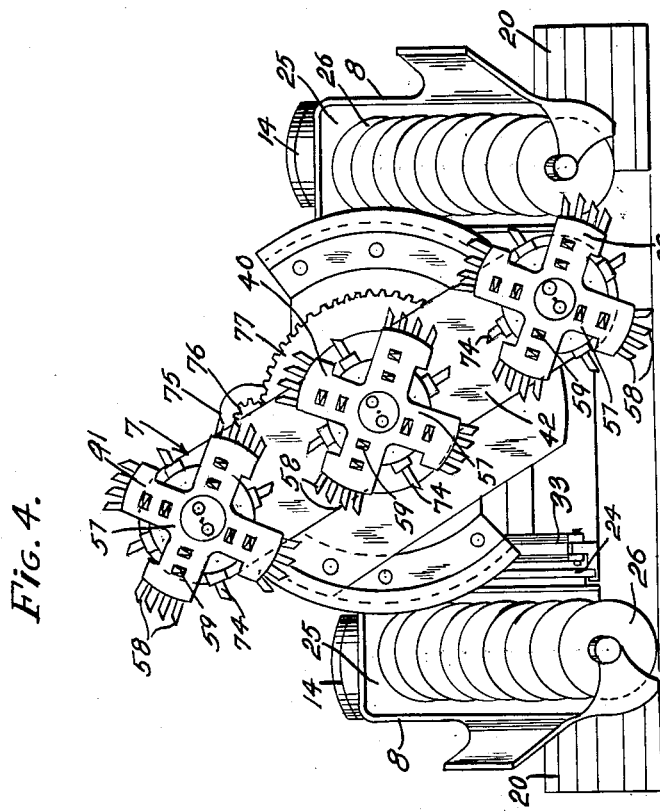
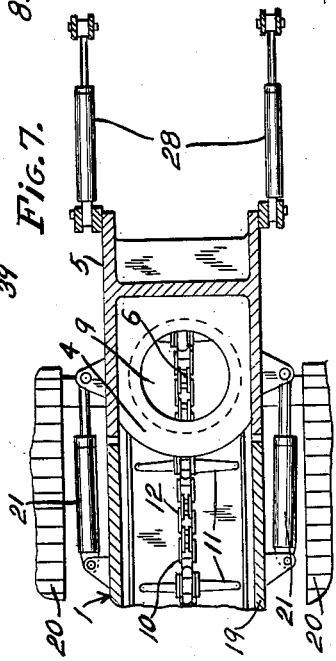
INVENTOR:
NEAL W. DENSMORE.
BY
ATTORNEY.

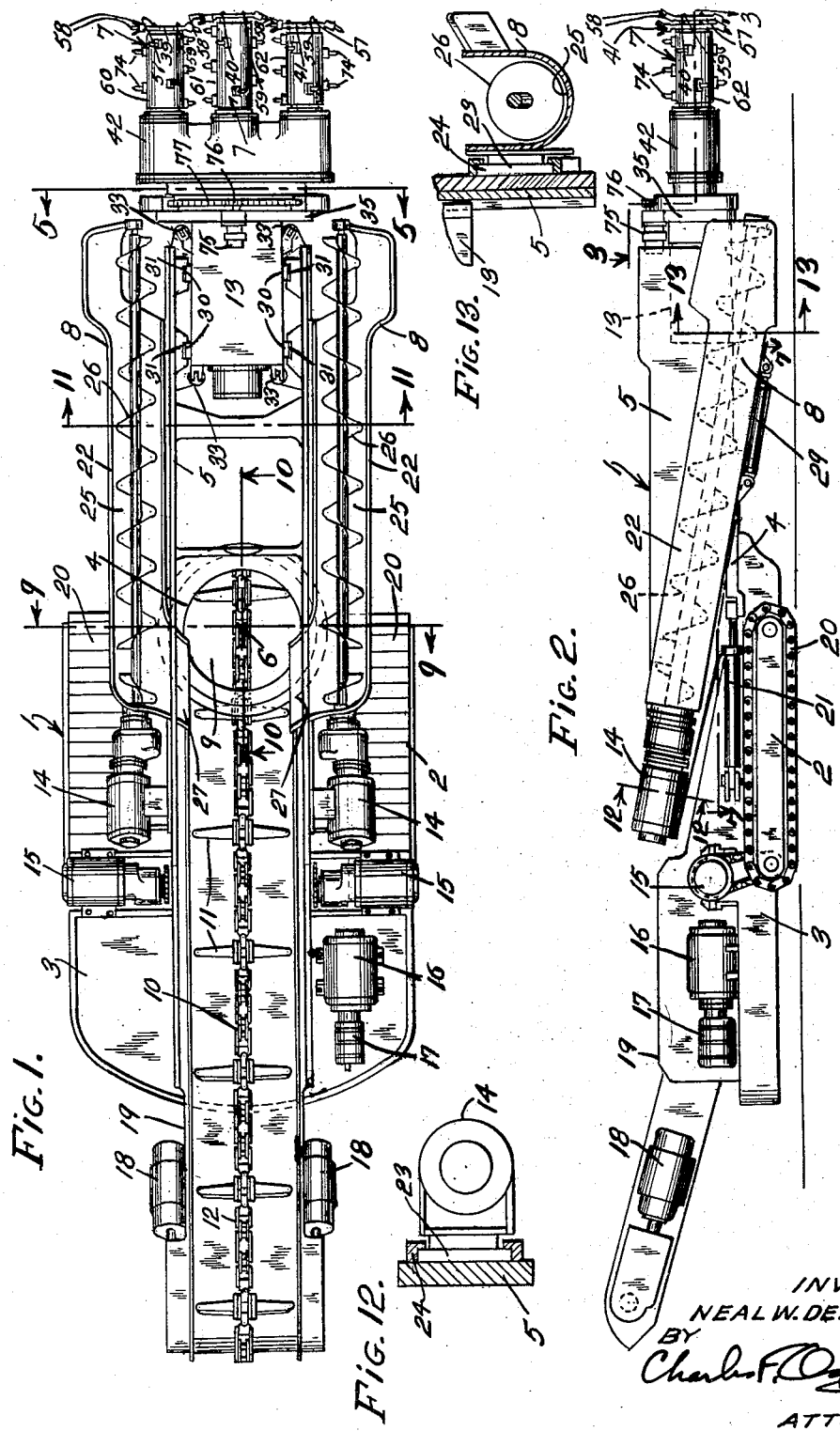

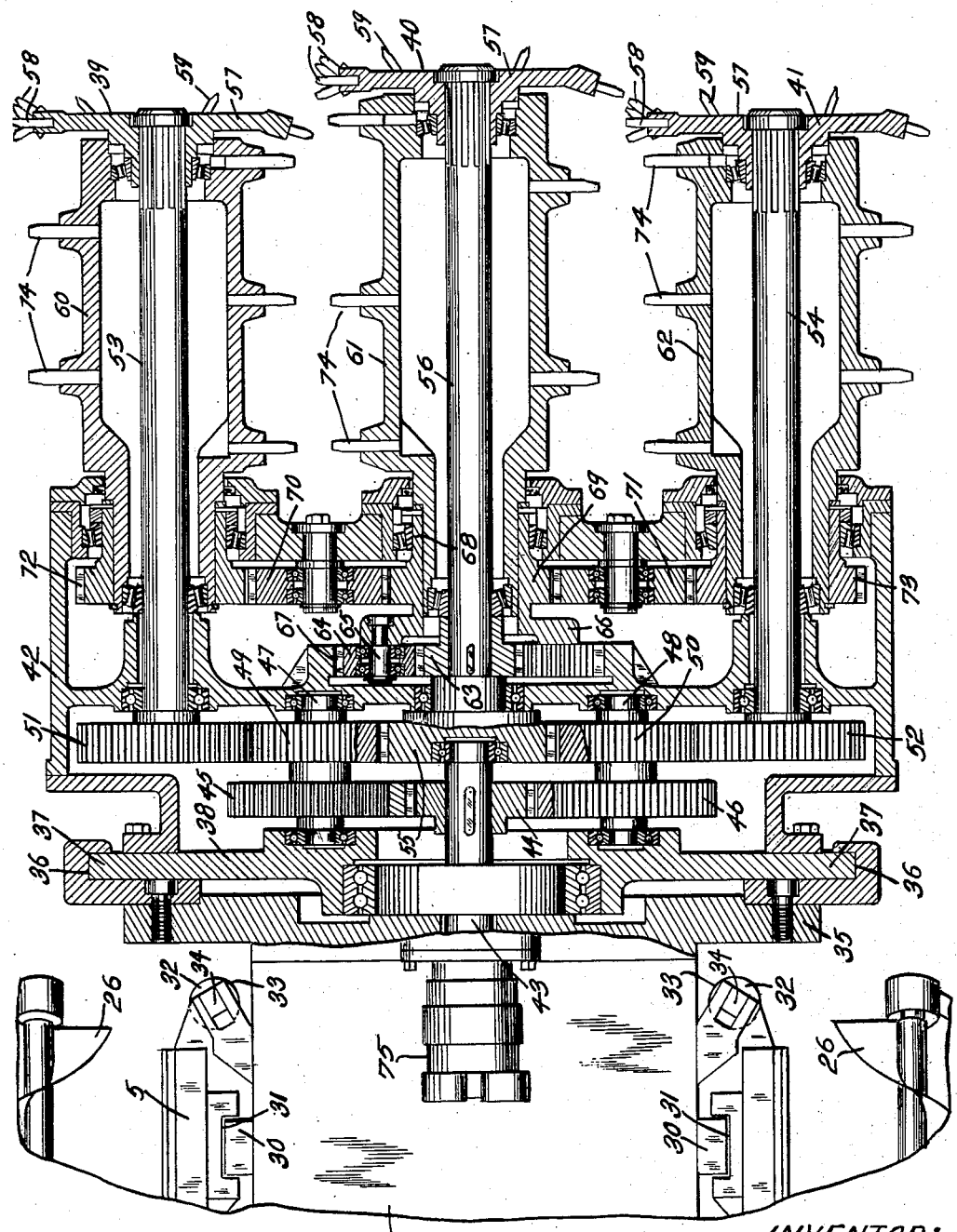

May 30, 1961 N. W. DENSMORE 2,986,385
MINING MACHINE HAVING A PLURALITY OF DISLODGING ROTORS
Filed July 22, 1957 10 Sheets-Sheet 4
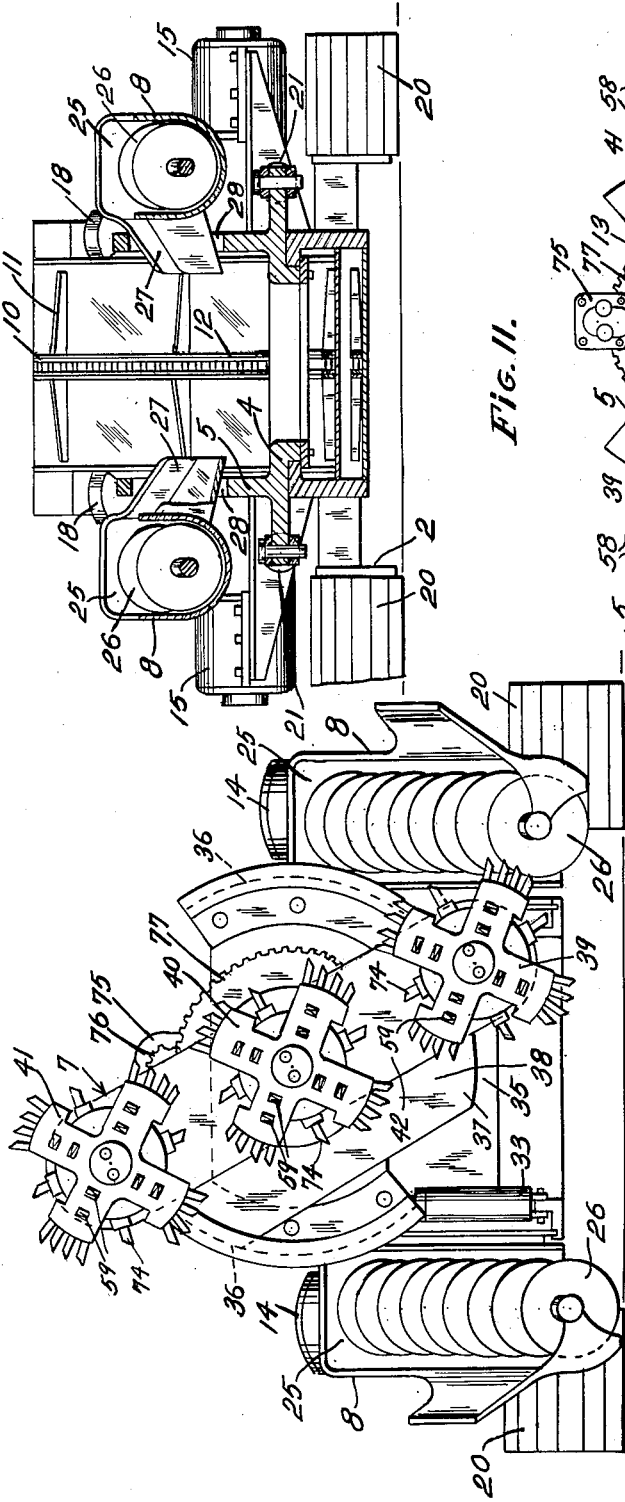
INVENTOR:
NEAL W. DENSMORE.
BY
Charles F. Osgood.
ATTORNEY.

May 30, 1961 N. W. DENSMORE 2,986,385
MINING MACHINE HAVING A PLURALITY OF DISLODGING ROTORS
Filed July 22, 1957 10 Sheets-Sheet 5

INVENTOR:
NEAL W. DENSMORE.
BY Charles F. Osgood,
ATTORNEY.

May 30, 1961  N. W. DENSMORE  2,986,385
MINING MACHINE HAVING A PLURALITY OF DISLODGING ROTORS
Filed July 22, 1957  10 Sheets-Sheet 6
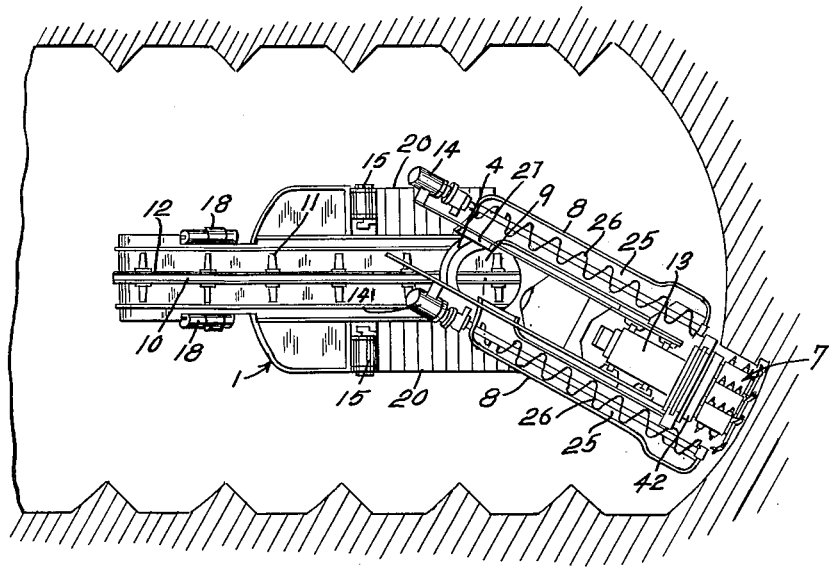
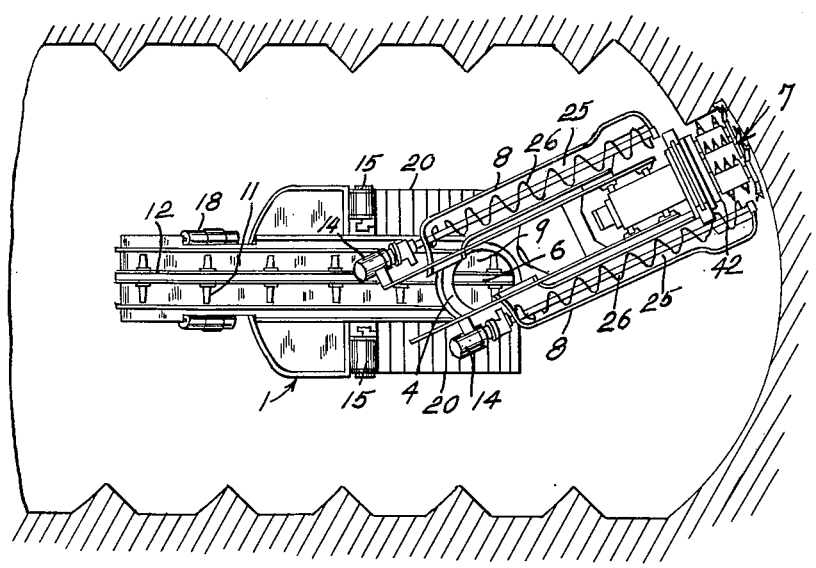
INVENTOR:
NEAL W. DENSMORE.
BY
Charles F. Osgood,
ATTORNEY.

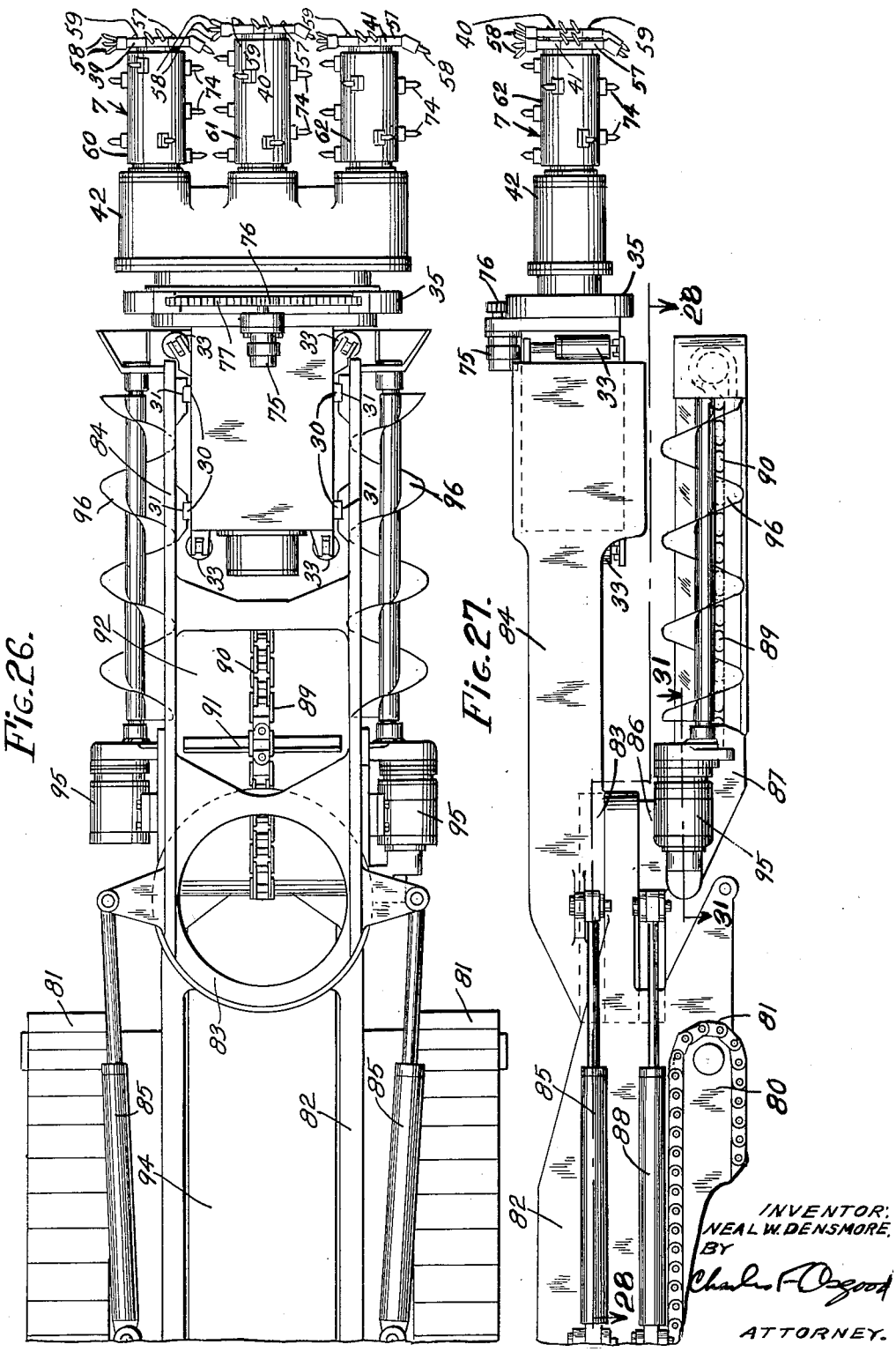

May 30, 1961 N. W. DENSMORE 2,986,385
MINING MACHINE HAVING A PLURALITY OF DISLODGING ROTORS
Filed July 22, 1957 10 Sheets-Sheet 9
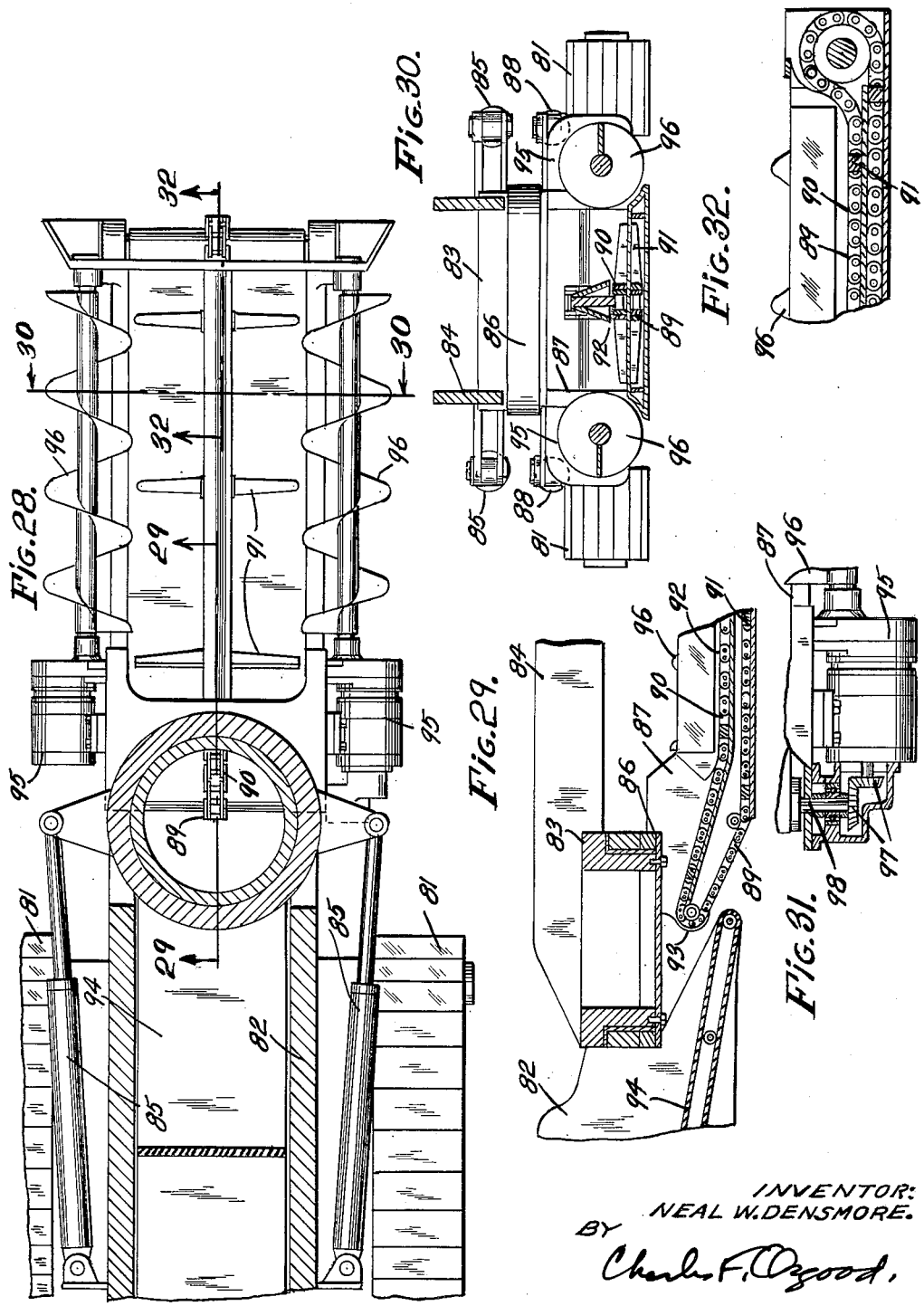
INVENTOR:
NEAL W. DENSMORE.
BY Charles F. Osgood,
ATTORNEY.

May 30, 1961  N. W. DENSMORE  2,986,385
MINING MACHINE HAVING A PLURALITY OF DISLODGING ROTORS
Filed July 22, 1957  10 Sheets-Sheet 10

INVENTOR:
NEAL W. DENSMORE.
BY
Charles F. Osgood.
ATTORNEY.

United States Patent Office 2,986,385
Patented May 30, 1961

2,986,385

MINING MACHINE HAVING A PLURALITY OF DISLODGING ROTORS

Neal W. Densmore, Franklin, Pa., assignor to Joy Manufacturing Company, Pittsburgh, Pa., a corporation of Pennsylvania Filed July 22, 1957, Ser. No. 673,470

4 Claims. (Cl. 262—9)

This invention relates to mining apparatus and more particularly to a mining and loading apparatus for dislodging mineral from a solid mine vein and for loading out the dislodged mineral.

The present invention relates to improvements over those of my copending application Serial No. 614,977, filed October 9, 1956, in that the operating range and efficiency are materially increased, and increased flexibility in operation is provided.

An object of the present invention is to provide an improved mining and loading machine having improved dislodging and disintegrating mechanism adjustable to different operating heights. Another object is to provide an improved reversible mining and loading machine adapted to operate in either of opposite directions. A further object is to provide an improved dislodging and disintegrating head mechanism embodying a plurality of rotary dislodging and disintegrating heads including central and side dislodging and disintegrating heads. A still further object is to provide an improved multiple head cutting and dislodging mechanism which may be adjusted for accommodation to different heights of mine veins. These and other objects and advantages of the invention will, however, hereinafter more fully appear.

In the accompanying drawings there are shown for purposes of illustration one form and a modification thereof which the invention may assume in practice.

In these drawings:

Fig. 1 is a top plan view and Fig. 2 is a side elevational view of a mining and loading apparatus constructed in accordance with a preferred illustrative embodiment of the invention.

Fig. 3 is an enlarged horizontal section taken on the planes of line 3—3 of Fig. 2, showing the multiple dislodging and disintegrating head mechanism.

Fig. 4 is an enlarged front end elevational view of the mining and loading machine shown in Figs. 1 and 2, with the head mechanism in tilted operating position.

Fig. 5 is an enlarged cross section taken on line 5—5 of Fig. 1, with the head mechanism in a horizontal position.

Fig. 6 is a view similar to Fig. 5 with the head frame in the tilted position of Fig. 4.

Fig. 7 is a horizontal section, taken on line 7—7 of Fig. 2, showing the swinging and tilting cylinders for the head mechanism.

Fig. 8 is a view similar to Fig. 4 showing the dislodging and disintegrating head mechanism in its elevated position above the floor.

Fig. 9 is an enlarged cross section taken on line 9—9 of Fig. 1.

Fig. 10 is a longitudinal vertical section taken on line 10—10 of Fig. 1.

Fig. 11 is an enlarged cross section taken on line 11—11 of Fig. 1.

Fig. 12 is a detail sectional view taken on line 12—12 of Fig. 2.

Fig. 13 is a detail vertical section taken on line 13—13 of Fig. 2.

Figs. 14, 15, 16 and 17 are somewhat diagrammatic plan views, with the mine vein in horizontal section, showing different operating positions of the machine in a mine.

Figs. 18 to 25 inclusive are schematic vertical sections showing different operating positions of the dislodging and disintegrating head mechanism during the mining operation.

Fig. 26 is a fragmentary top plan view and Fig. 27 is a fragmentary side view of the mining and loading machine, showing a modified construction.

Fig. 28 is a horizontal section taken on line 28—28 of Fig. 27.

Fig. 29 is a longitudinal vertical section taken on line 29—29 of Fig. 28.

Fig. 30 is a cross section taken on line 30—30 of Fig. 28.

Fig. 31 is a horizontal section taken on line 31—31 of Fig. 27.

Fig. 32 is a longitudinal vertical section taken on line 32—32 of Fig. 28.

Figure 33:
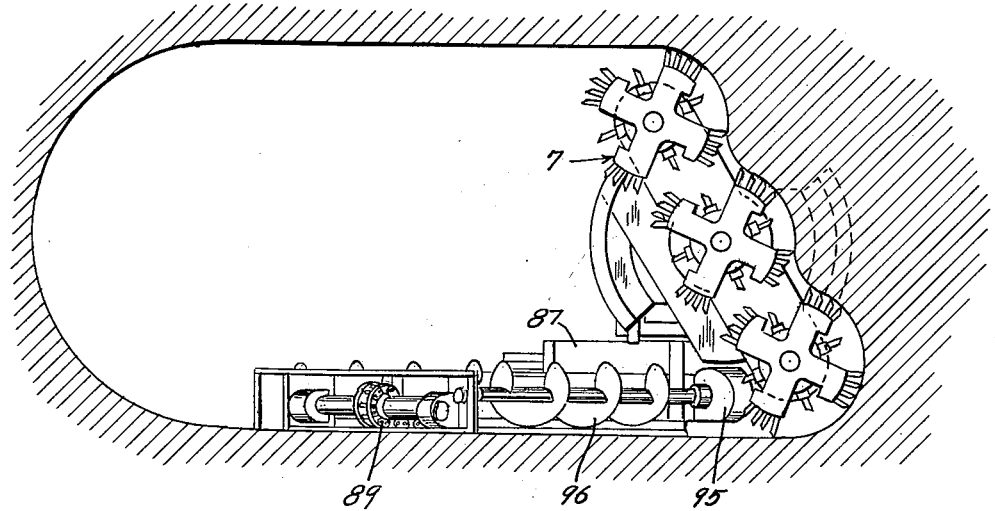

Fig. 33 is a schematic cross section showing the modified machine in operating position in a mine.

Figure 34:
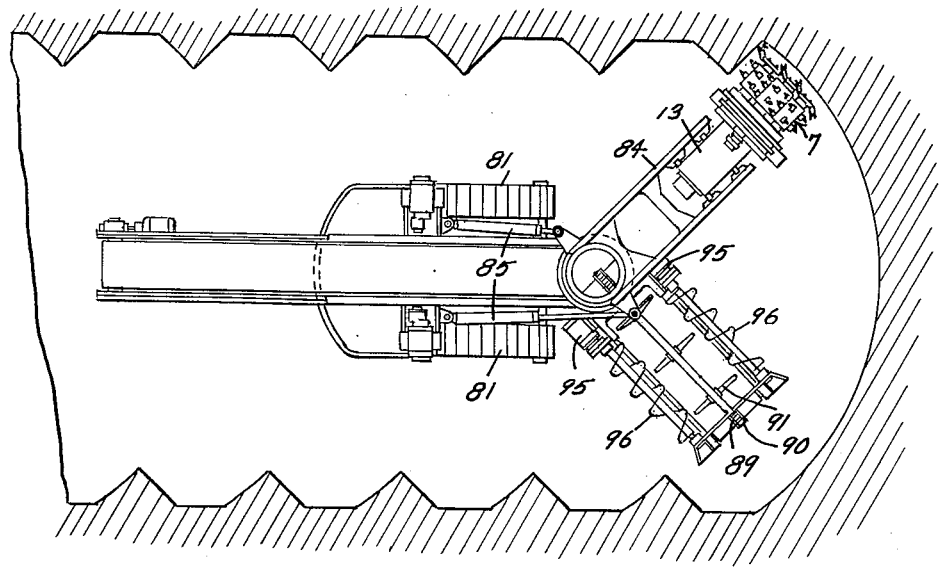

Fig. 34 is a diagrammatic plan view showing an operating position of the modified mining and loading machine.

In the illustrative construction shown in Figs. 1 to 25 inclusive of the drawings, the mining and loading machine is generally designated 1 and generally comprises a mobile base 2 carrying a frame 3 on which a turntable mounting 4 is carried. A horizontal frame 5 is carried on the turntable mounting to swing horizontally about an upright axis at 6 relative to the base frame 3. A reversible dislodging and disintegrating head mechanism generally designated 7 is adjustably mounted on the forward portion of the swingable frame 5 in advance of the base. Gathering devices 8 extend generally longitudinally at opposite sides of the swingable frame 5 at opposite sides of the dislodging and disintegrating mechanism for gathering loose material on the mine floor and for conveying the gathered material rearwardly for discharge into a hopper 9, and a conveying means 10 comprising cross flights 11 and a central drive chain 12 serves to move the material from the hopper rearwardly of the machine to a convenient point of delivery. A motor 13 serves to drive the dislodging and disintegrating mechanism while motors 14 serve to drive the gathering and conveying devices 8 respectively. Motors 15 respectively drive the propelling means for the base while a motor 16 drives a conventional pumping means 17 for supplying liquid under pressure to the several hydraulically operated motor devices of the machine. Motors 18 carried at the sides of the rearward frame 19 of the conveying means 10 drive the endless conveyor chain 12.

The mobile base is desirably in the form of a crawler base and has separate side crawler treads 20 respectively driven by the motors 15 and these treads may be separately or concurrently driven by the motors to effect propulsion and steering of the machine both during tramming and the mining operation. Extensible power devices 21 desirably hydraulic jacks serve to swing the frame 5 horizontally about the axis of the turntable mounting and for holding the swingable frame in its different adjusted positions with respect to the base.

The gathering devices 8 include reciprocable frames 22 having guides 23 slidingly received within forwardly and downwardly inclined guideways 24 on the sides of the swingable frame to move longitudinally relative to the swingable frame, and these frames have chambers 25 for receiving conventional conveyor scrolls 26. The motors 14 are respectively operatively connected to the conveyor scrolls for driving the latter, and rearward side chutes 27 direct the loose material conveyed from the scrolls inwardly toward the hopper 9. These side chutes extend laterally inwardly through longitudinal openings 28 in upright sides of the frame 5 in positions to discharge onto the conveying means 10 in all adjusted positions of the gathering devices. Extensible power devices 29 serve to advance and retract the scroll frames or casings longitudinally along their guides to vary the position of the forward receiving ends or receiving portions of the scrolls with respect to the mine floor.

The casing of the motor 13 provides an adjustable support for the head mechanism 7 and has lateral upright guides 30 received in vertical guideways 31 on the forward portion of the swingable frame 5. Extensible power devices 32 in the form of hydraulic jacks serve to raise and lower the motor casing along the upright guideways thereby to vary the elevation of the head mechanism. These jacks comprise upright cylinders 33 extending substantially in parallelism with the vertical guideways and pivotally connected at their lower ends to the swinging frame, and containing reciprocable pistons having their piston rods 34 pivotally connected at their upper ends to the sides of the motor casing. Thus, the support for the head mechanism may be adjusted vertically into different elevated positions with respect to the swinging frame and by trapping liquid in the jack cylinders the support may be held in its positions of adjustment.

The motor 13 has its casing carrying a front transverse frame portion 35 having secured thereto lateral arcuate or segmental guideways 36 in which arcuate guides 37 of a tiltable or rotative frame 38 are engaged. The head mechanism comprises three parallel rotating dislodging and disintegrating heads or rotors 39, 40 and 41 suitably journaled within bearings supported by a head frame 42 attached to the tiltable or rotative frame 38 and the central head is coaxial with the rotatable frame pivot as hereinafter described more in detail. The motor has its longitudinally extending power shaft 43 suitably journaled in bearings supported within the frame portion 35 and the rotatable frame 38, and secured to the motor shaft is a spur gear 44 meshing at its opposite sides with spur gears 45 and 46 in turn secured to parallel shafts 47 and 48 respectively suitably journaled within the tiltable frame and the head frame 42. Also secured to the shafts 47 and 48 are spur gears 49 and 50 respectively meshing with and driving outer spur gears 51 and 52 secured to head shafts 53 and 54 respectfully of the side heads. The gears 49 and 50 mesh with a centrally located spur gear 55 keyed to a head shaft 56 of the central head. Secured to the outer ends of the shafts 53, 54 and 56 are the heads or rotors 39, 41 and 40 respectively which are desirably in the form of rotary slot cutting and boring instruments in the form of cutter wheels 57 carrying peripheral cutting teeth 58 and front face cutting teeth 59. Journaled on the head shafts are breaker drums or rotors 60, 61 and 62 respectively arranged in coaxial relation with the rotating cutter wheels and the driving means for these breaker drums or rotors comprise a spur gear 63 keyed to the central head shaft 56 and meshing with planet gears 64 journaled on shafts 65 supported by a planet carrier 66. These planet gears mesh with an internal gear 67 suitably secured to the head frame 42. The planet carrier 66 has a sleevelike hub 68 keyed to the rear portion of the central core breaker drum 61, and in turn secured to the hub 68 is a spur gear 69 meshing at its opposite sides with spur gears 70 and 71 which in turn mesh with and drive spur gears 72 and 73 secured to the rear portions of the side breaker drums 60 and 62 respectively. Thus the three core breaker drums or rotors rotate about parallel axes coincident with the cutter wheel axes at a relatively slow core breaking speed. Attached to the peripheries of the core breaker drums are conventional breaker or disintergrating teeth 74. The central or intermediate breaker drum 61 is of slightly greater length than the side drums and the intermediate cutter wheel is desirably disposed in advance of the side cutter wheels, as shown in Fig. 3. When the heads are fed toward the work the boring instruments drill into the face and when the heads are swung laterally arcuate slots are cut inside the face to form cores and the breaker drums break away the cores. The cutter wheel and breaker drum or rotor arrangement above described may be similar in structure and operation to that disclosed in the A. Lee Barrett Patent No. 2,776,823, dated January 8, 1957, owned by the same assignee as the present invention.

A motor 75, desirably a conventional hydraulic fluid motor, is mounted on the frame portion 35 at the top of the motor 13 and a spur pinion 76 fixed to the motor shaft meshes with the teeth of a gear segment 77 formed on or otherwise secured to the tiltable head frame, for rotating or tilting the head frame about the axis of the central dislodging and disintegrating head or rotor to vary the elevation of the side dislodging and disintegrating heads with respect to the mine floor. By rotating the head frame about its longitudinal axis either side head or rotor may be moved arcuately to the floor and roof levels. By trapping liquid in the motor 75 the head frame may be locked in adjusted position.

Figure 14:
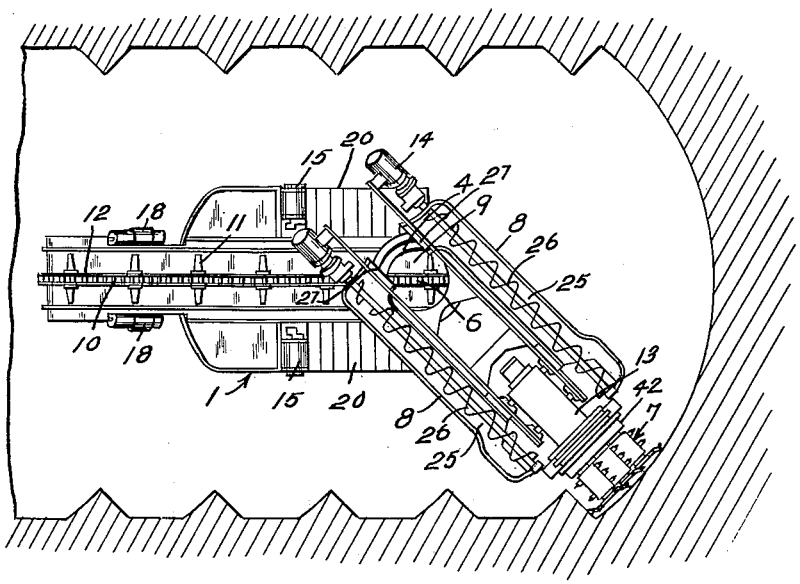
Figure 15:
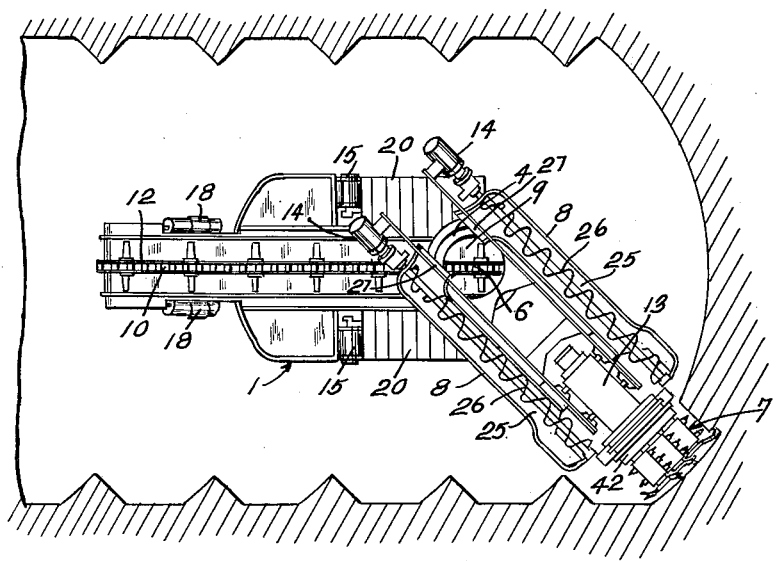
Figure 18:
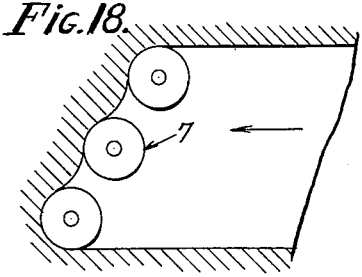
Figure 19:
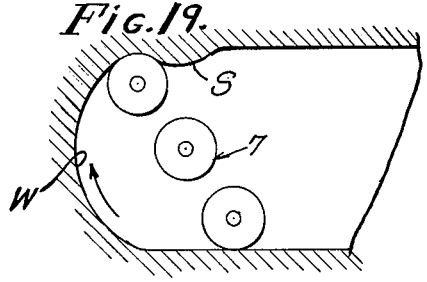
Figure 20:
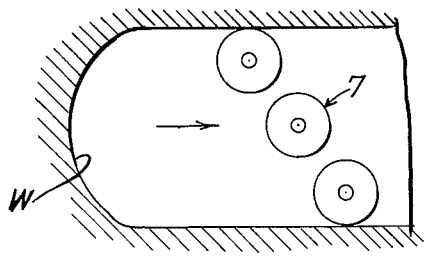

The general mode of operation of the embodiment of the invention above described is as follows. The machine may be trammed about the mine under the propulsion of the treads of the crawler base and the treads may be separately or simultaneously driven by one or both of the motors 15 at relatively different speeds to effect steering of the machine. When the working face is reached the dislodging and disintegrating head mechanism may be sumped into the mineral of the solid mine vein at one rib by the crawler base, then swung arcuately across the face and withdrawn from the face by the crawler base at the opposite rib, as shown diagrammatically in Figs. 14 to 17 inclusive. The sumping of the head mechanism by the crawler treads at the right-hand rib is shown in Fig. 15 and it will be evident that the head mechanism may be sumped into the vein by the crawler treads at either rib. When the head mechanism is in sumped position and is swung arcuately a short distance from right to left, as shown in Fig. 16, the trailing gathering and loading conveyor 8 may be advanced by its fluid cylinder 29 into a position at the rear or trailing side of the lower boring head, so that the dislodged and disintegrated mineral may be engaged by the trailing conveyor scroll and moved rearwardly and upwardly to discharge into the turntable hopper 9, wherein it is received and conveyed rearwardly by the rear conveyor 10. In Fig. 18 the dislodging and disintegrating heads or rotors are shown in an angular position about the tiltable frame axis with the lower rotor operating at the floor level and the upper rotor operating at the roof level and with the head mechanism operating from right to left. When the left hand rib is reached, the motor 75 may be operated to tilt or rotate the head frame 42 to swing the side heads or rotors arcuately, to cut along an arcuate path, as shown in Fig. 19 to form the curved sidewall at W, thereby to bring the lower rotor up to the roof and the upper rotor down to the floor. The head mechanism may then be swung horizontally from left to right from Fig. 19 to Fig. 20 to remove the remaining projection or stump S from the roof.

Figure 21:
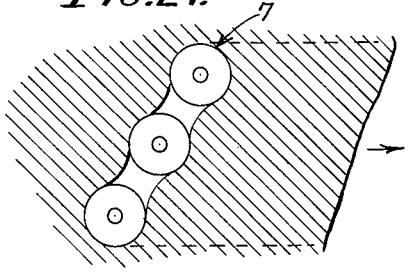
Figure 22:
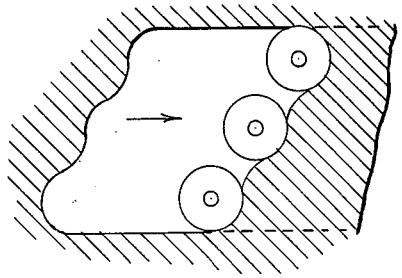
Figure 23:
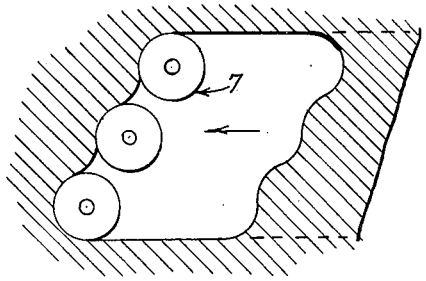
Figure 24:
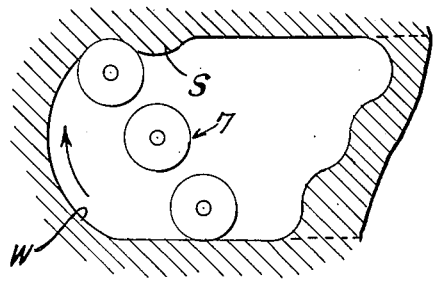
Figure 25:
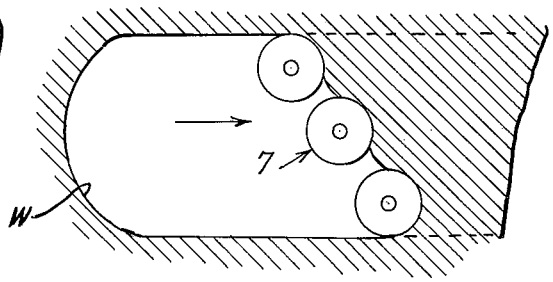

In Fig. 21 the head mechanism is shown sumped to a new position at the left-hand rib and the head mechanism may then be fed laterally, as shown in Fig. 22, toward the right-hand rib. When the head mechanism assumes the position shown in Fig. 22 it may be fed laterally back toward the left to the position shown in Fig. 23, and the head mechanism may be rotated or tilted to move the side boring heads arcuately as shown in Fig. 24 to form an advanced curved wall W at the left-hand rib thereby bringing the lower boring head up to the roof and the upper boring head down to the floor. The head mechanism may then be fed laterally to the right to move the roof projection or stump S in Fig. 24 and then continue laterally, as shown in Fig. 25, toward the right-hand rib. The operations above described are repeated at the right-hand rib and thereafter another advance cut from right to left may be effected.

In Figs. 26 to 34 inclusive a modified form of mining and loading machine is disclosed having novel floor clean up means. The machine of this embodiment comprises a crawler base 80 having endless side treads 81 similar to those of the preferred embodiment. The crawler base has a frame 82 on the forward portion of which a turntable 83 is mounted by which a horizontally swingable frame 84 is carried. The outer portion of this swingable frame carries the reversible dislodging and disintegrating head mechanism 7 which is essentially the same as that above described. Extensible power devices 85 desirably in the form of hydraulic jacks serve to swing the frame 84 horizontally about its pivot, and these jacks may have liquid trapped therein to hold the swinging frame in adjusted position. Also mounted on the base frame in coaxial relation with and underlying the turntable 83 is a turntable 86 carrying a horizontal frame 87 disposed close to the mine floor and swingable horizontally relative to and independently of the swingable frame 84. Extensible power devices 88 desirably in the form of hydraulic jacks serve to swing the frame 87 horizontally about the second turntable axis. Guided for circulation on the frame 87 is a conventional endless conveyor 89 comprising a central drive chain 90 to which lateral flights 91 are attached, and the flights are movable along a troughlike passageway 92. The conveyor 89 has an elevated rear discharge end 93 (Fig. 29) and a conventional endless belt conveyor 94 guided for circulation on the base has its forward receiving end underlying the discharge end 93 of the front conveyor in all positions of the swingable frame 87 about its pivot.

Carried by the swingable frame 87 at the opposite sides of its rearward portion are motors 95 which drive through suitable speed reducers gathering scrolls or rotary gatherers 96 extending longitudinally at opposite sides of the swingable frame close to the mine floor. One of the motors is operatively connected through bevel gearing 97 (Fig. 31) to a drive shaft 98 for the conveyor 89. The clean up mechanism is reversible and the gathering scrolls may pick up material from the floor irrespective of the direction in which the frame 87 is swung and, as earlier mentioned, the dislodging and disintegrating head mechanism is also reversible.

In Fig. 33 the dislodging and disintegrating head mechanism is shown operating from left to right in a mine and the gathering and conveying mechanism trails in back of the dislodging and disintegrating head mechanism so that the loose material fallen to the mine floor during the mining operation may be gathered and moved laterally onto the flight conveyor 89. In Fig. 34 the head mechanism is shown operating from right to left across the face of the mine vein and the gathering and loading conveyor is shown trailing in back of the head mechanism in a position to gather up and load out the dislodged and disintegrated material on the mine floor. By suitably operating the swing cylinders 88 for the conveyor the latter may be swung relative to and beneath the head mechanism into positions at either side of the latter and by trapping liquid in the swing cylinders the conveyor may be held in adjusted position. If desired, the head mechanism and the conveyor mechanism may be swung in unison about their coaxial pivots.

As a result of this invention an improved mining and loading machine is provided having improved structural features whereby increased operating range and efficiency are obtained, as well as improved flexibility in operation. By the provision of the adjustable boring heads or rotors arranged and constructed as disclosed the machine may be readily accommodated to mine veins of varying heights. The three parallel boring heads or rotors including the intermediate and side rotors, with the latter adjustable about the axis of the intermediate rotor, enable ready variation in the operating height of the machine and by the provision thereof the dislodging and disintegrating operation may be greatly expedited. By the provision of the improved reversible floor clean up means associated with the reversible dislodging and disintegrating head mechanism the mine floor may be cleaned up and the material loaded during either direction of operation of the head mechanism. These and other advantages of the invention will be clearly apparent to those skilled in the art.

While there are in this application specifically described one form and a modification which the invention may assume in practice, it will be understood that this form and modification of the same are shown for purposes of illustration and that the invention may be further modified and embodied in various other forms without departing from its spirit or the scope of the appended claims.

What I claim as new and desire to secure by Letters Patent is:

1. A mining machine comprising, a support, a dislodging and disintegrating head mechanism mounted on said support, said head mechanism including a rotatable frame mounted to tilt in transverse planes about an axis extending longitudinally of the machine, said head mechanism including a central dislodging and disintegrating rotor the axis of which is aligned with the pivot axis of said frame, said head mechanism including a pair of other dislodging and disintegrating rotors arranged on axes parallel to said pivot axis and spaced in diametrically opposite directions therefrom, said rotors having disintegrating cutter wheels arranged thereon to travel at a faster relative speed than said rotors, said cutter wheels having cutter teeth, respectively, moving in overlapping orbits and a motor means mounted on said support and operably connected to said rotors for driving said rotors.

2. A mining machine comprising, a support, dislodging and disintegrating head mechanism mounted on said support, said head mechanism including a rotatable frame mounted to tilt in transverse planes about an axis extending longitudinally of the machine, said head mechanism including a plurality of elongated dislodging and disintegrating rotors arranged on parallel axes and extending outwardly from said support, motor means mounted on said support for driving said rotors, and each of said rotors having additional cutting means at the end thereof remote from said support which are driven by said motor means at a higher speed than said rotors are driven, and said cutting means move in overlapping orbits.

3. A mining machine comprising, a support, a dislodging and disintegrating head mechanism mounted on said support, said head mechanism including a rotatable frame mounted to tilt in transverse planes about an axis extending longitudinally of the machine, said head mechanism including a plurality of elongated dislodging and disintegrating rotors arranged on parallel axes, motor means mounted on said support and operably connected to said rotors for driving said rotors and cutter wheels with disintegrating teeth arranged on the forward portion of said rotors to revolve in overlapping orbits.

4. A continuous mining machine comprising a frame having a support, means for vertically adjusting said support, a mine vein dislodging and disintegrating mechanism carried by said support, means for rotatably adjusting said disintegrating mechanism on said support about a horizontal axis extending longitudinally of said machine, said disintegrating mechanism comprising a plurality of rotors having axes parallel to said horizontal axis with the axis of one rotor being coincident with said horizontal axis, said rotors carrying disintegrating elements on the forward portion therof, some of said elements being mounted in advance of other of said elements thereby arranged to travel in overlapping relationship regardless of the position the disintegrating mechanism is rotatably adjusted, and power means for rotating said rotors and disintegrating elements at different speeds.

References Cited in the file of this patent

UNITED STATES PATENTS

| | | |
|---|---|---|
| Re. 24,004 | Howard | May 17, 1955 |
| 1,529,628 | Legrand | Mar. 10, 1925 |
| 2,327,928 | Osgood | Aug. 24, 1943 |
| 2,639,895 | Gallo | May 26, 1953 |
| 2,734,731 | Cartlidge et al. | Feb. 14, 1956 |
| 2,767,970 | Paul | Oct. 23, 1956 |
| 2,776,809 | Barrett | Jan. 8, 1957 |
| 2,777,681 | Ball | Jan. 15, 1957 |
| 2,841,379 | Driehaus | July 1, 1958 |

FOREIGN PATENTS

| | | |
|---|---|---|
| 560,813 | France | July 19, 1923 |
| 706,214 | Great Britain | Mar. 24, 1954 |